United States Patent
Inoue

(10) Patent No.: US 6,968,213 B1
(45) Date of Patent: Nov. 22, 2005

(54) MOBILE TELEPHONE HAVING A REDIAL FUNCTION RELATING MULTIPLE REDIAL NUMBERS TO A SELECTED REDIAL NUMBER AND REDIAL METHOD THEREFOR

(75) Inventor: Jiro Inoue, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/406,671

(22) Filed: Sep. 27, 1999

(30) Foreign Application Priority Data

Sep. 28, 1998 (JP) .......................................... 10-273988

(51) Int. Cl.$^7$ ................................................. H04B 1/38
(52) U.S. Cl. .................... 455/564; 455/566; 455/412.1; 455/435.1; 379/216; 379/355.01
(58) Field of Search ................................ 455/564, 565, 455/412, 550, 575, 90, 66, 566; 379/354, 355, 355.01, 355.02, 216.01, 357.05

(56) References Cited

U.S. PATENT DOCUMENTS

| | | | | |
|---|---|---|---|---|
| 4,930,155 A | * | 5/1990 | Kurokawa ................... | 379/354 |
| 4,939,768 A | * | 7/1990 | Inaba et al. ................. | 455/563 |
| 4,980,910 A | * | 12/1990 | Oba et al. .............. | 379/357.03 |
| 5,251,250 A | * | 10/1993 | Obata et al. ............. | 455/412.2 |
| 5,394,462 A | * | 2/1995 | Maemura ............... | 379/142.01 |
| 5,493,604 A | * | 2/1996 | Hirayama ................... | 455/564 |
| 5,677,949 A | * | 10/1997 | Macor ........................ | 379/354 |
| 5,689,557 A | * | 11/1997 | Kaplan .................. | 379/355.05 |
| 5,715,311 A | * | 2/1998 | Sudo et al. ............ | 379/433.01 |
| 5,802,165 A | * | 9/1998 | Kim ....................... | 379/355.05 |
| 5,805,694 A | * | 9/1998 | Kim ............................ | 379/354 |
| 5,963,875 A | * | 10/1999 | Go .............................. | 455/564 |
| 6,064,725 A | * | 5/2000 | Nakanishi .................... | 379/140 |
| 6,223,051 B1 | * | 4/2001 | Rikihisa ...................... | 455/564 |
| 6,285,872 B1 | * | 9/2001 | Murata ........................ | 455/415 |
| 6,321,098 B1 | * | 11/2001 | Beith et al. ................. | 455/564 |
| 6,353,736 B1 | * | 3/2002 | Hiromichi ................... | 455/406 |
| 6,442,261 B1 | * | 8/2002 | Pearsall ................. | 379/142.01 |

FOREIGN PATENT DOCUMENTS

| | | |
|---|---|---|
| DE | 4423789 | 8/1996 |
| EP | 0540928 | 5/1993 |
| EP | 0663752 | 7/1995 |
| JP | 2-87751 | 3/1990 |
| JP | 7-87197 | 3/1995 |

OTHER PUBLICATIONS

Patent Abstracts of Japan, vol. 014, No. 278 (E–0941), Jun. 15, 1990 & JP 02–087751 A (Canon), Mar. 28, 1990 *abstract*.

* cited by examiner

*Primary Examiner*—Tilahun Gesesse
(74) *Attorney, Agent, or Firm*—Dickstein, Shapiro, Morin & Oshinsky, LLP

(57) ABSTRACT

A mobile telephone which can easily reach a target person and obtain a plurality of phone numbers thereof is disclosed. Registered phone numbers related to registered names are retrievably stored in a phone directory memory. A radial number memory stores a plurality of radial phone numbers which have been dialed. By selecting one of the radial phone numbers, a registered phone number related to the selected radial phone number is sequentially displayed to be redialed.

10 Claims, 5 Drawing Sheets

REDIAL NUMBER SELECTION BY REDIAL KEY A

RELATED NUMBER SELECTION BY REDIAL KEY B

US 6,968,213 B1

MOBILE TELEPHONE HAVING A REDIAL FUNCTION RELATING MULTIPLE REDIAL NUMBERS TO A SELECTED REDIAL NUMBER AND REDIAL METHOD THEREFOR

BACKGROUND OF THE INVENTION

1. Field of the Invention

The present invention generally relates to a portable or mobile communication device with a memory storing dialing information, and in particular to a telephone having a radial function and a redial method therefor.

2. Description of the Related Art

With the widespread use of mobile telephones, a growing number of people possess two or more telephones including a stationary telephone connected to a public telephone subscriber line. In such a situation, since a single person has a plurality of telephone numbers assigned thereto, there are cases where two or more telephone numbers are sequentially dialed to make contact with that person.

To make such a dialing operation easy, a telephone having the function of retrieving telephone numbers related to the last-dialed telephone number has been proposed in Japanese Patent Unexamined Publication No. 2 87751. This conventional telephone is provided with a redial key as well as a redial-next key. The redial key, as well known, is used to redial the last telephone number dialed. The redial-next key is used to retrieve telephone numbers related to the last-dialed number from a memory storing telephone numbers related to a specific telephone number. The retrieved telephone numbers can be read out sequentially at each push of the redial-next key.

In the case where the user wants to see telephone numbers related to a telephone number other than the last-dialed number, however, it is necessary to manually retrieve a phone directory. Such a manual search operation is inconvenient for the user.

SUMMARY OF THE INVENTION

An object of the present invention is to provide a mobile telephone and a redial method which can easily reach a desired person.

Another object of the present invention is to provide a mobile telephone which can easily find a plurality of registered phone numbers for a desired person.

According to the present invention, a mobile telephone having a redial function is comprised of: a display device; an input device for inputting a desired instruction; a first memory for retrievably storing a plurality of registered phone numbers related to a plurality of registered names; a second memory for storing a plurality of redial phone numbers which have been dialed; and a controller controlling such that a registered phone number related to a selected redial phone number is displayed on the display device to be redial ed depending on an instruction input through the input device.

One of the redial phone numbers stored in the second memory may be sequentially selected and displayed on the display device to be redialed depending on a first selection instruction. Further, a registered phone number related to a selected redial phone number may be selected and displayed on the display device to be redial ed depending on a second selection instruction. The first and second selection instructions are input through the input device.

Preferably, a registered phone number related to the selected redial phone number is sequentially selected from the first memory in predetermined order.

The input device may be comprised of a first redial key for producing the first selection instruction and a second redial key for producing the second selection instruction.

Alternatively, the input device may be comprised of a single redial key. The controller discriminates between the first selection instruction and the second selection instruction based on a length of time that the single redial key is depressed.

According to the present invention, a method for redialing a phone number in a mobile telephone having a redial function, comprises the steps of: a) retrievably storing a plurality of registered phone numbers related to a plurality of registered names in a phone directory memory; b) storing a plurality of redial phone numbers which have been dialed in a redial number memory; c) selecting one of the redial phone numbers stored in the redial number memory; d) retrieving a plurality of registered phone numbers related to a selected redial phone number from the phone directory memory; and e) redialing a selected one of the retrieved registered phone numbers depending on a calling instruction.

As described above, according to the present invention, a plurality of registered phone numbers for a single person can be easily retrieved and redial ed. Therefore, it can easily reach a desired person for a relatively short time and further easily find a plurality of registered phone numbers for a desired person by selecting the redial phone numbers stored in the redial number memory.

DETAILED DESCRIPTION OF THE PREFERRED EMBODIMENT

Figure 1:
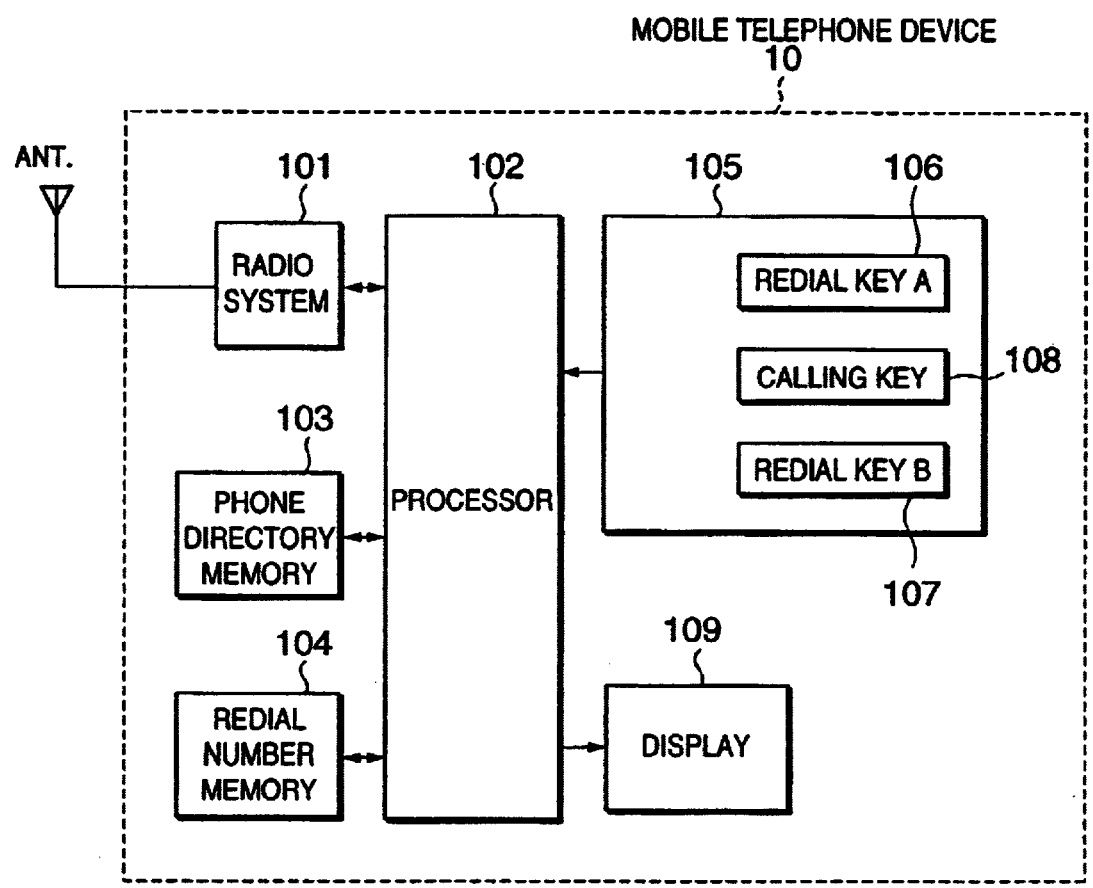
FIG. 1 is a block diagram showing a radio mobile telephone according to an embodiment of the present invention.

Referring to FIG. 1, there is shown a mobile telephone in accordance with the present invention. The mobile telephone is provided with a radio system 101 which transmits and receiver a radio signal to and from a radio base station (not shown) under control of a processor 102. The processor 102 may be a program-controlled processor such as a central processing unit (CPU). A control program for the mobile telephone is stored in a read-only memory (not shown) and runs on the processor 102 to control all operations of the mobile telephone including a redialing operation as described later.

The mobile telephone is further provided with a phone directory memory 103 and a redial number memory 104, which can be accessed by the processor 102. As will be described later, the phone directory memory 103 retrievably stores a plurality of telephone numbers and the redial number memory 104 stores a predetermined number of telephone numbers which have been dialed so far.

A keypad 105 is provided on the main surface of a housing of the mobile telephone 10. The keypad 105 is used by the user to do various instructions such as registering of a new telephone number, retrieval of a telephone number, and redial of a selected telephone number. In this embodiment, the keypad 105 includes a first redial key (A) 106, a second redial key (B) 107, and a calling key 108. The redial key (A) 106 is used to select one of the telephone numbers stored in the redial number memory 104. The redial key (B) 107 is used to read out telephone numbers related to the phone number selected by the redial key (A) 106 from the phone directory memory 103. Necessary information is displayed on a display 109, which may employ a liquid-crystal display (LCD).

The same function as a combination of the redial keys (A) 106 and (B) 107 can be also realized by simultaneous push of two or more different predetermined keys, which will result in reduced number of keys on the operation panel. Alternatively, the same function as a combination of the redial keys (A) 106 and (B) 107 can be realized by monitoring the length of time that a redial key is pushed. For example, a short-time push provides the redial function corresponding to the redial key (A) 106 and a long-time push provides the retrieval function corresponding to the redial key (B) 107. In this case, only one redial key can provide the same function as a combination of the redial keys (A) 106 and (B) 107.

Figure 2:
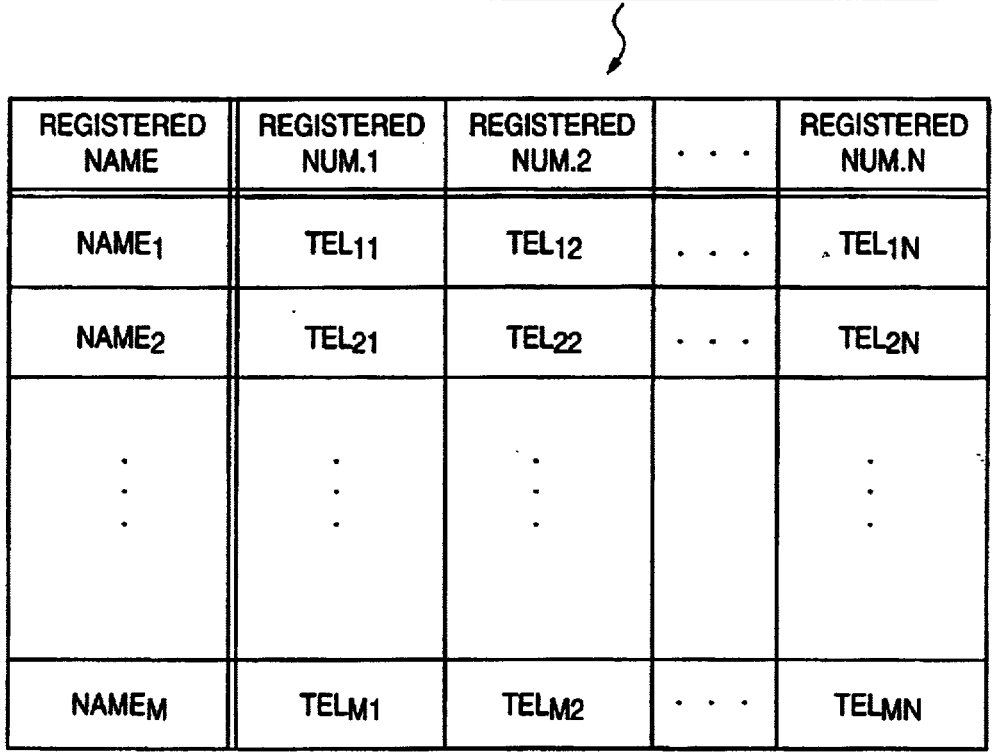
FIG. 2 is a schematic diagram showing an example of the contents of a phone directory memory provided in the embodiment.

Referring to FIG. 2, the phone directory memory 103 stores an M×N relational table consisting of a registered name field and N registered number fields. It is assumed that the phone directory memory 103 stores a total of M persons whose names are $NAME_1$, $NAME_2$, ... $NAME_M$, respectively, each registered name having a plurality of telephone numbers related thereto. For example, the registered name $NAME_2$ has N phone numbers $TEL_{21}$, $TEL_{22}$ ... $TEL_{2N}$. As described later, if any phone number for a registered name is selected as a key word, then the other phone numbers related to the selected phone number can be read out and displayed on the display 109. In the case of the registered name $NAME_2$, specifically, if the phone numbers $TEL_{21}$ is selected from the redial number memory 104, then the other phone numbers $TEL_{22}$, ... $TEL_{2N}$ can be sequentially displayed at each push of the redial key (B) 107.

Figure 3:
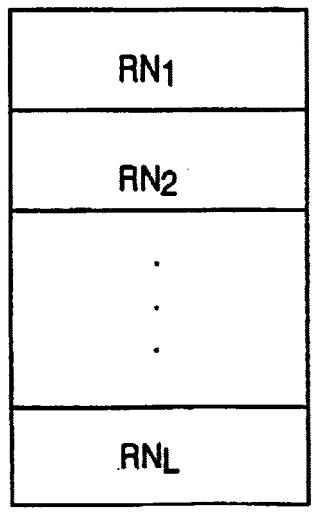
FIG. 3 is a schematic diagram showing an example of the contents of a redial number memory provided in the embodiment.

Referring to FIG. 3, the redial number memory 104 stores a plurality of phone numbers which have been dialed. Here, the redial number memory 104 stores L phone numbers $RN_1$–$RN_L$, which are sequentially selected at each push of the redial key (A) 106.

The processor 102 controls the redial number memory 104 such that both successful and unsuccessful phone numbers are written while automatically deleting the oldest phone number when the redial number memory 104 is full. Alternatively, as to unsuccessful phone number, only the last-dialed one may be stored in the redial number memory 104, which results in memory saving. Even when a phone number has been successfully redial ed, it is preferable that the successful phone number is left in the redial number memory 104 for later confirmation.

In the embodiment, there is provided a link between the redial key (A) 106 and the redial key (B) 107. First, one of the stored phone numbers $RN_1$–$RN_L$ is selected as a desired phone number by the user operating the redial key (A) 106. Thereafter, by pushing the redial key (B) 107, the processor 102 searches the phone directory memory 103 according to the phone number selected by the redial key (A) 106 and then sequentially displays the found phone numbers related to the selected phone numbers are sequentially displayed.

REDIAL NUMBER SELECTION

Figure 4:
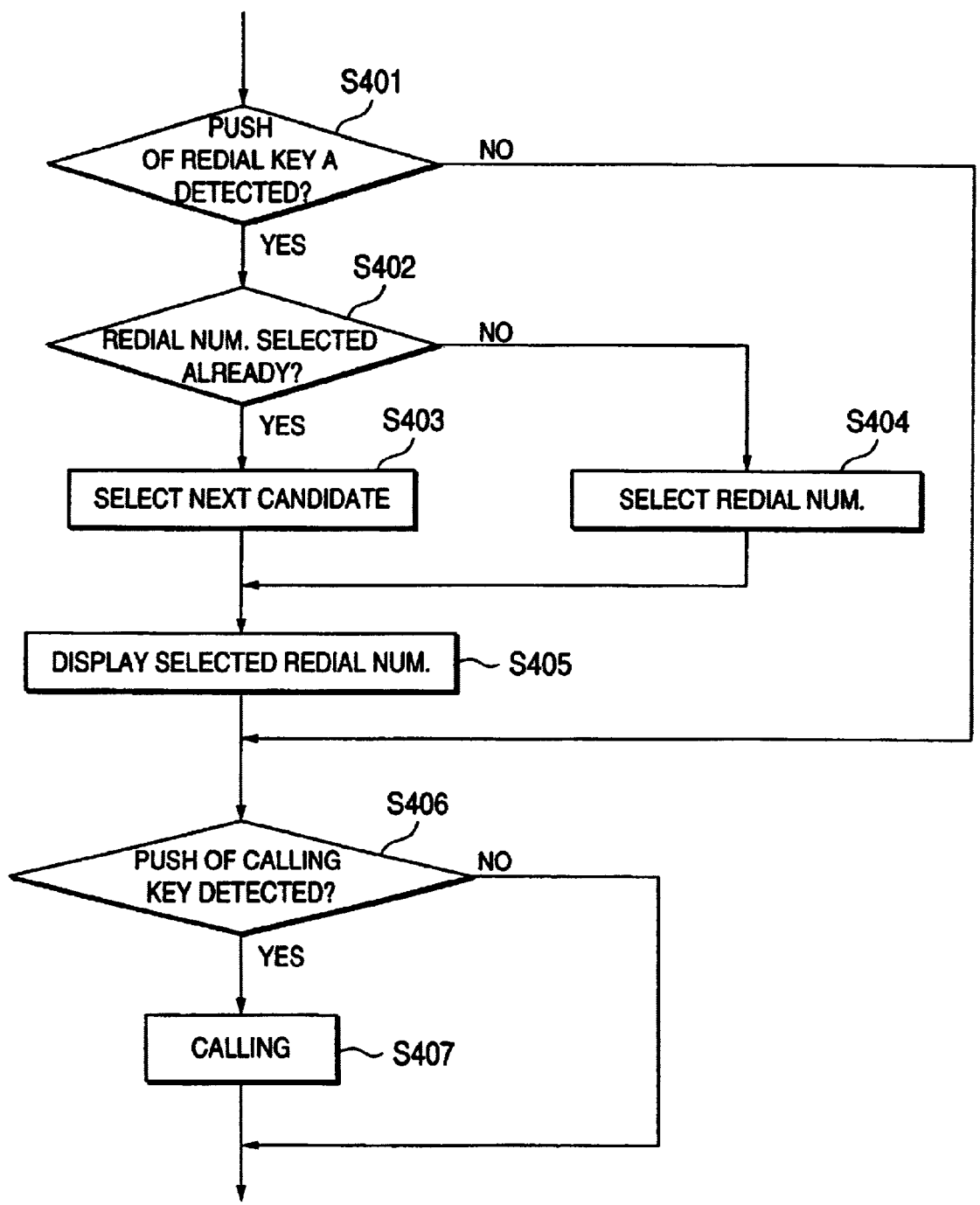
FIG. 4 is a flowchart showing an operation of a redial key A provided in the embodiment.

Referring to FIG. 4, when detecting a push of the redial key (A) 106 (YES in step 3401), it is determined whether one of the redial numbers stored in the redial number memory 104 has been already selected (step S402). If one redial number has been already selected and displayed on the display 109 (YES in step S402), then a next redial number following the one redial number in the redial number memory 104 is selected as a redial candidate (step S403). If no redial number is selected (NO in step S402), then one of the redial numbers stored in the redial number memory 104 is selected (step S404). The default may be the last-dialed redial number in the redial number memory 104.

The selected redial number at the step S403 or S404 is displayed on the display 109 (step S405) and then it is determined whether a push of the calling key 108 is detected (step S406). If the calling key 108 is pushed (YES in step S406), then the processor 102 controls the radio system 101 to perform the calling operation (step S407). If the calling key 108 is not pushed (NO in step S406), then the processor 102 waits for a push of the calling key 108, the redial key (A) 106, or the redial key (B) 107.

If a push of the redial key (A) 106 is detected in the case of a redial number having been selected and displayed (YES in steps S401 and S403), a next redial number is selected. In this way, the redial numbers stored in the redial number memory 104 are sequentially selected at each push of the redial key (A) 106.

Figure 6:
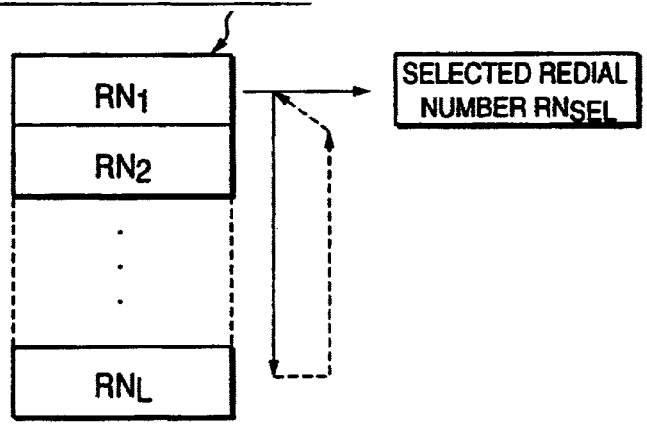
FIG. 6 is a schematic diagram for explanation of a function of the redial key A.

As shown in FIG. 6, such a redial number selection operation is done according to the steps of FIG. 4. More specifically, at each push of the redial key (A) 106, the stored redial numbers are sequentially and cyclically selected and displayed in order presented as follows: $RN_1$ (default) →$RN_2$→$RN_3$→ ... →$RN_L$→$RN_1$→$RN_2$→ ... The selected redial number $RN_{SEL}$ is used to make a call or as a keyword to search for related phone numbers as described hereinafter.

RELATED NUMBER RETRIEVAL

Figure 5:
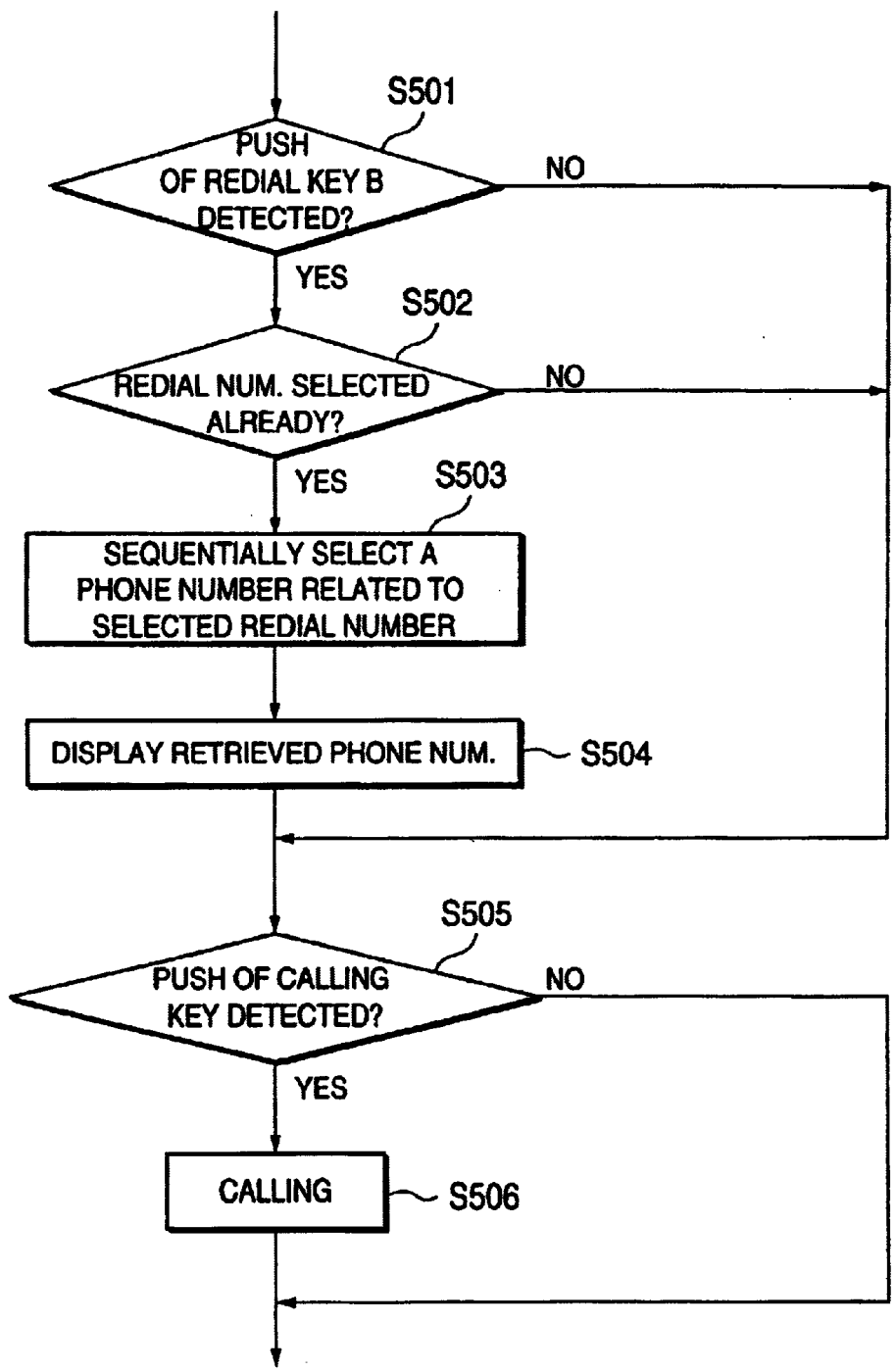
FIG. 5 is a flowchart showing an operation of a redial key B provided in the embodiment.

Referring to FIG. 5, when detecting a push of the redial key (B) 107 (YES in step S501), it is determined whether one of the redial numbers stored in the redial number memory 104 has been already selected (step S502). If one redial number has been already selected and displayed on the display 109 (YES in step S502), then the processor 102 searches the phone directory memory 103 for the selected redial number and then sequentially selects one of the found phone numbers related to the selected redial number (step S503).

When the selected phone number at the step S503 is displayed on the display 109 (step S504), when a push of the redial key (B) 107 is not detected (NO in step S501), or when no redial number is selected (NO in step S502), it is determined whether a push of the calling key 108 is detected (step S505). If the calling key 108 is pushed (YES in step S506), then the processor 102 controls the radio system 101 to perform the calling operation (step S506). If the calling key 108 is not pushed (NO in step S506), then the processor 102 waits for a push of the calling key 108, the redial key (A) 106, or the redial key (B) 107.

If a push of the redial key (B) 107 is detected in the case of a redial number having been selected and displayed (YES in steps S501 and S502), a next related phone number is selected. In this way, the related phone numbers stored in the phone directory memory 103 are sequentially selected at each push of the redial key (B) 107.

Figure 7:
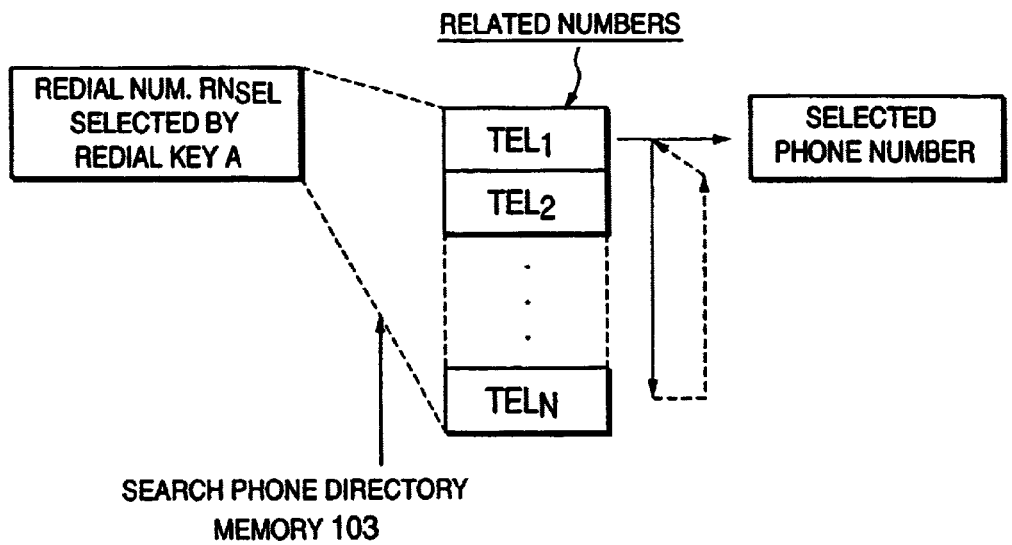
FIG. 7 is a schematic diagram for explanation of a function of the redial key B.

As shown in FIG. 7, such a related number selection operation is done according to the steps of FIG. 5. Assuming that a redial number $RN_{SEL}$ is selected by the redial key (A) 106, the processor 102 searches the phone directory memory 103 for the selected redial number $RN_{SEL}$. Since the table stored in the phone directory memory 103 is a kind of database, the processor 102 retrieves a record (or a line of the table) consisting of a registered name and a plurality of registered phone numbers $TEL_1$ $TEL_N$, one of which is the selected redial number $RN_{SEL}$. Thereafter, at each push of the redial key (B) 107, the processor 102 sequentially selects one of the retrieved phone numbers $TEL_1$–$TEL_N$ other than the selected redial number $RN_{SEL}$ and a selected one is displayed in order presented as follows: $TEL_1 \rightarrow TEL_2 \rightarrow TEL_3 \rightarrow \ldots \rightarrow TEL_N \rightarrow TEL_1 \rightarrow TEL_2 \rightarrow \ldots$ The selected phone number is used to make a call.

For example, in FIG. 2, it is assumed that one phone number $TEL_{22}$ is selected as a selected redial number $RN_{SEL}$. In this case, the processor 102 retrieves the record of the registered name $NAME_2$ including the phone number $TEL_{22}$. Thereafter, at each push of the redial key (B) 107, the processor 102 sequentially selects one of the retrieved phone numbers $TEL_{21}$ and $TEL_{22}$–$TEL_N$, that is, the retrieved phone numbers are displayed in order presented as follows: $TEL_{21} \rightarrow TEL_{23} \rightarrow TEL_{24} \rightarrow \ldots \rightarrow TEL_{2N} \rightarrow TEL_{21} \rightarrow TEL_{23} \rightarrow \ldots$ The selected phone number is used to make a call depending on the user's instruction.

In the case where the number of related phone numbers is different among the registered names, it is preferable that the number of related phone numbers for a selected registered name is displayed on the display 109. This causes the user to check the presence or absence of a related phone number and the number of the related phone numbers, resulting in enhanced convenience in phone number selection.

What is claimed is:

1. A mobile telephone device having a redial function, comprising:

a display device;

an input device for inputting a desired instruction;

a first memory for retrievably storing a plurality of registered phone numbers related to a plurality of registered names;

a second memory for storing a plurality of redial phone numbers which have been dialed; and a controller for controlling such that a registered phone number related to a selected redial phone number is displayed on the display device to be redial ed depending on an instruction input through the input device wherein said controller is further adapted to retrieve a plurality of redial phone numbers from said first and second memory, said phone numbers being related to said registered phone numbers for sequential dialing, until a connection is made.

2. A mobile telephone according to claim 1, wherein the controller controls such that:

one of the redial phone numbers stored in the second memory is sequentially selected and displayed on the display device to be redial ed depending on a first selection instruction; and a registered phone number related to a selected redial phone number is selected and displayed on the display device to be redial ed depending on a second selection instruction, wherein the first and second selection instructions are input through the input device.

3. A mobile telephone according to claim 2, wherein the controller selects a registered phone number related to the selected redial phone number from the first memory in predetermined order.

4. A mobile telephone according to claim 2, wherein the input device comprises:

a first redial key for producing the first selection instruction; and a second redial key for producing the second selection instruction.

5. A mobile telephone according to claim 2, wherein the input device comprises a single redial key, wherein the controller discriminates between the first selection instruction and the second instruction based on a length of time that the single redial key is depressed.

6. A mobile telephone according to claim 1, wherein the controller displays a number of registered phone numbers related to the selected redial phone number on the display device.

7. A mobile telephone according to claim 1, wherein the controller stores both successful and unsuccessful phone numbers onto the second memory while automatically deleting an oldest phone number when the second memory is full.

8. A mobile telephone according to claim 1, wherein the controller stores successful phone numbers and only a last-dialed phone number of unsuccessful phone numbers onto the second memory while automatically deleting an oldest phone number when the second memory is full.

9. A method for redialing a phone number in a mobile telephone having a redial function, comprising the steps of:

a) retrievably storing a plurality of registered phone numbers related to a plurality of registered names in a phone directory memory;

b) storing a plurality of redial phone numbers which have been dialed in a redial number memory;

c) selecting one of the redial phone numbers stored in the redial number memory;

d) retrieving a plurality of registered phone numbers related to a said selected redial number from the phone directory memory; and e) redialing a selected one of the retrieved registered phone numbers depending on a calling instruction, further comprising the step of:

f) repeating the step e) while sequentially selecting the retrieved registered phone numbers until a connection is made.

10. A method according to claim 9, wherein the registered phone numbers are sequentially selected in predetermined order.

* * * * *